(12) United States Patent
Liu et al.

(10) Patent No.: US 11,216,552 B2
(45) Date of Patent: Jan. 4, 2022

(54) SYSTEM AND METHOD FOR VERIFYING FIRST TIME USE OF AN INFORMATION HANDLING SYSTEM

(71) Applicant: DELL PRODUCTS, LP, Round Rock, TX (US)

(72) Inventors: Wei G Liu, Austin, TX (US); Nelson Cheng, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 16/597,299

(22) Filed: Oct. 9, 2019

(65) Prior Publication Data

US 2021/0110026 A1 Apr. 15, 2021

(51) Int. Cl.
G06F 21/45 (2013.01)
G06F 21/33 (2013.01)
H04L 9/06 (2006.01)
G06F 21/79 (2013.01)
H04L 9/08 (2006.01)
G06F 21/57 (2013.01)

(52) U.S. Cl.
CPC .............. *G06F 21/45* (2013.01); *G06F 21/33* (2013.01); *G06F 21/572* (2013.01); *G06F 21/79* (2013.01); *H04L 9/0643* (2013.01); *H04L 9/0822* (2013.01)

(58) Field of Classification Search
None
See application file for complete search history.

(56) References Cited

U.S. PATENT DOCUMENTS

| | | | | |
|---|---|---|---|---|
| 7,725,723 | B2* | 5/2010 | Landrock | H04L 63/126 713/176 |
| 8,707,452 | B1* | 4/2014 | Block | G06F 21/41 726/28 |
| 2003/0041268 | A1* | 2/2003 | Hashimoto | H04L 29/12009 726/4 |
| 2016/0350132 | A1* | 12/2016 | Seibert | G06F 11/0748 |
| 2019/0091579 | A1* | 3/2019 | Potulwar | A63F 13/73 |

* cited by examiner

*Primary Examiner* — William J. Goodchild
(74) *Attorney, Agent, or Firm* — Larson Newman, LLP

(57) ABSTRACT

An information handling system includes a basic input/output system that checks for a first-time password in NVRAM, and prompts a user for a password when the first-time password is present. A processor compares the password to the first-time password, deletes the first-time password from the NVRAM when the password matches the first-time password, and boots the information handling system when the password matches the first-time password.

20 Claims, 5 Drawing Sheets

SYSTEM AND METHOD FOR VERIFYING FIRST TIME USE OF AN INFORMATION HANDLING SYSTEM

FIELD OF THE DISCLOSURE

The present disclosure generally relates to information handling systems, and more particularly relates to verifying first time use of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input/output system that may check for a first-time password in NVRAM, and prompt a user for a password when the first-time password is present. A processor may compare the password to the first-time password, delete the first-time password from the NVRAM when the password matches the first-time password, and boot the information handling system when the password matches the first-time password.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
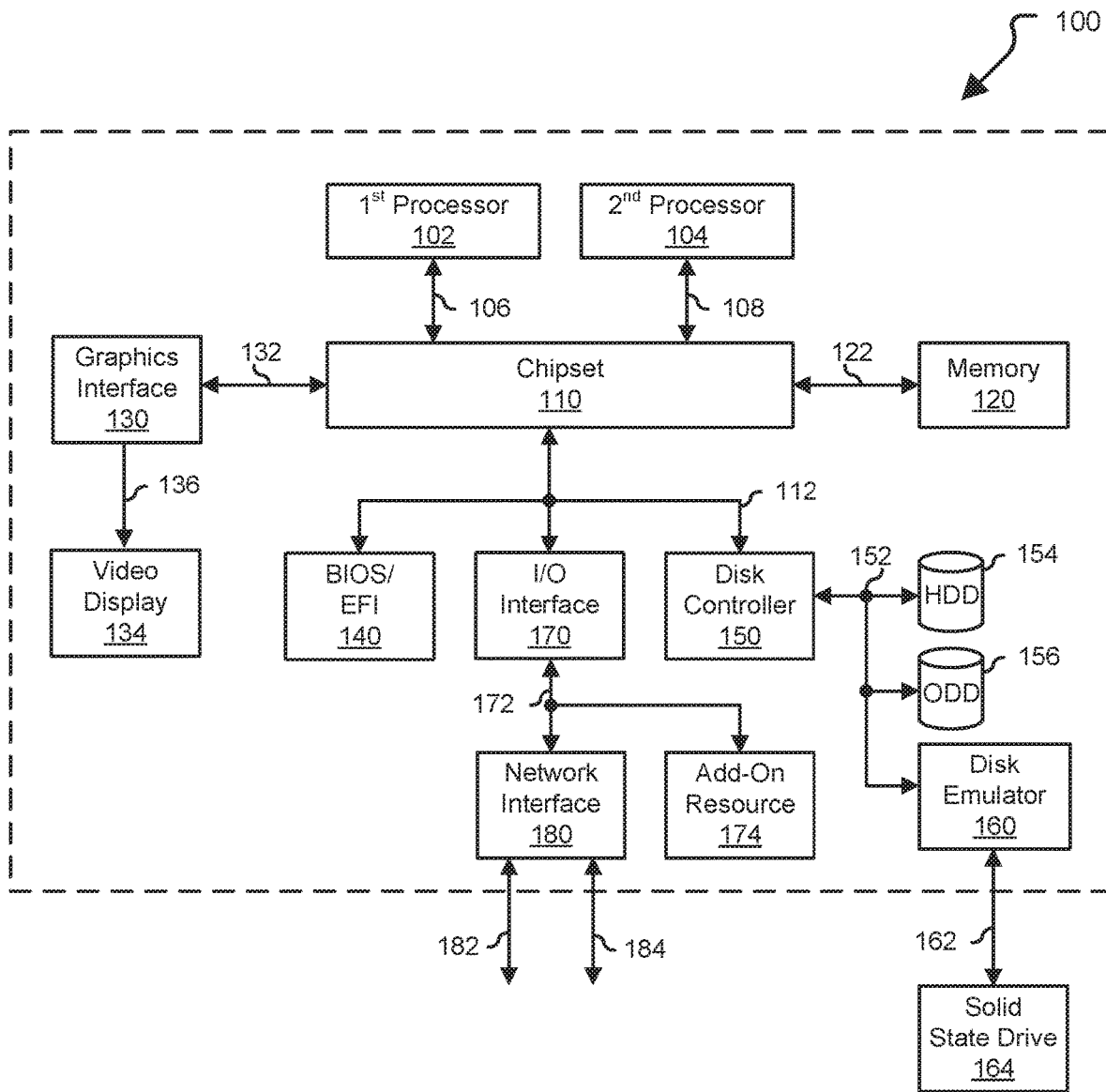
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NVRAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

In various embodiments, it can be desirable to verify first use of an information handling system. Through first use verification, a user can know that they are the first person to use the information handling system since it left the manufacturing facility. First use verification can prevent a third-party reseller from passing off used or returned hardware as new. Additionally, first use verification can be used to detect tampering with the system, such as the installation of malicious components. The first use verification system can provide peace of mind to the end user.

Figure 2:
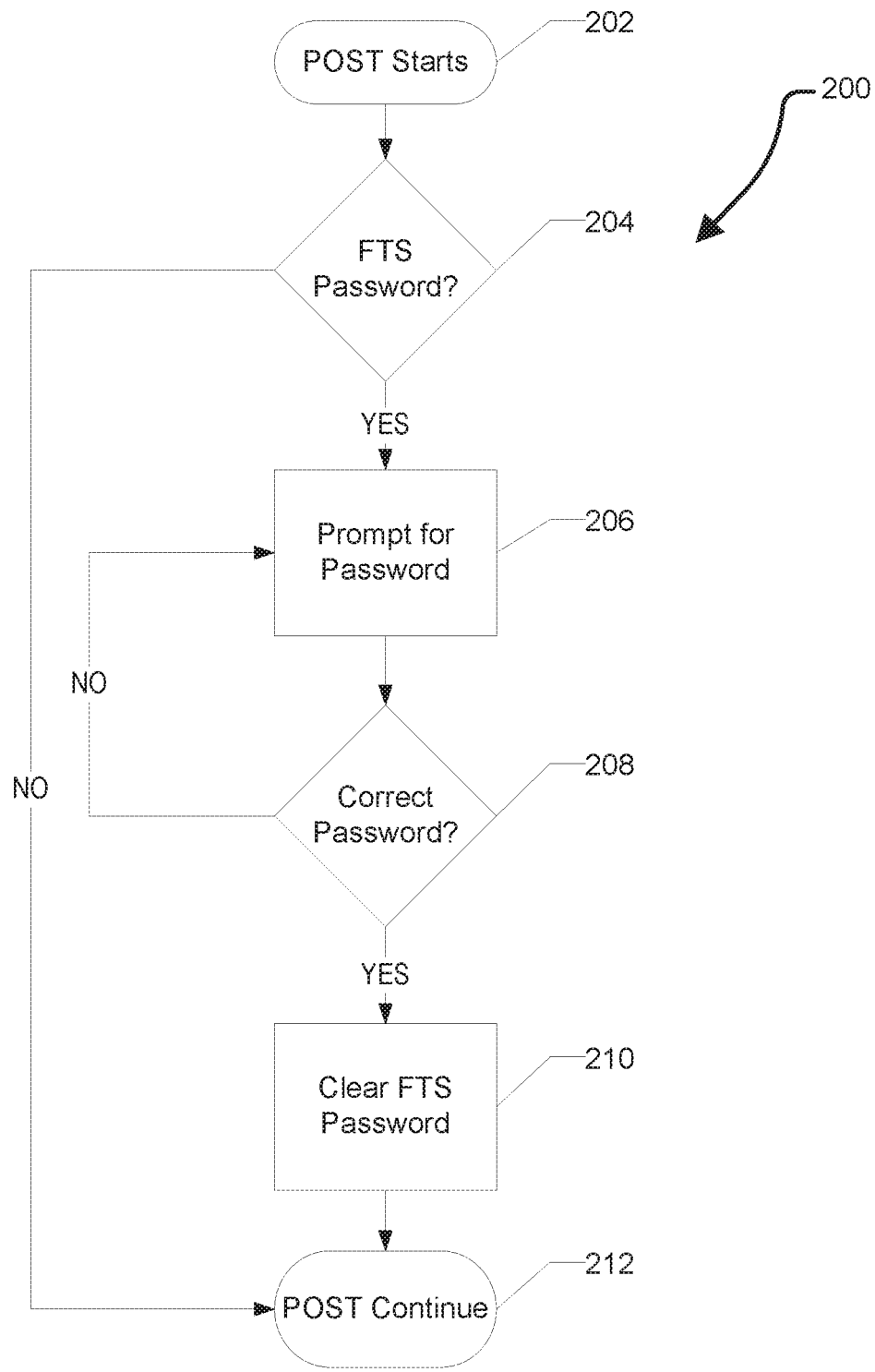
FIG. 2 is a flow diagram illustrating an exemplary method to verify first-time use of an information handling system according to an embodiment of the present disclosure.

FIG. 2 illustrates a method 200 of verifying first-time use of an information handling system. At 202, when the information handling system, such as system 100 of FIG. 1, starts up, the system can being a power-on self-test (POST). The POST can be performed by the basic input/output system (BIOS) to determine if various system components, such as the memory, the disk controller, and various other components, are working correctly.

At 204, the BIOS can determine if a first-time seal password has been set. The first-time seal password can be a one-time use password provided to the user by the system manufacture that is required to boot the system for the first time. If the password is present, then the user can know that the system has not been used prior to their receipt of the system. If the password is not present, then it can be assumed that the system has been used previously.

At 206, if the first-time-seal password is set, the BIOS can prompt the user for the password. At 208, the BIOS can determine if the password provided by the user matches the stored first-time seal password. If the password matches, BIOS can clear the password at 210, and the POST can continue to boot at 212.

If the password provided by the user does not match, the BIOS can indicate the password is incorrect and return to 206 to prompt the user to enter the correct password. In various embodiments, the BIOS can use techniques to limit random guessing and brute force attempts to determine the password. For example, the BIOS may shut the system down after a number of failed attempts, requiring the user to restart the system before attempting to enter the password again. By way of another example, the BIOS may implement a delay between entering an incorrect password and having the opportunity to enter another password. In some embodiments, the delay can increase as the number of failed password attempts increases. In extreme cases, the BIOS may even disable the system entirely after a large number of failed password attempts, requiring the system to be reset by the manufacturer or a manufacturers technician.

The manufacturer can provide the end-user with the first-time seal password in various ways, preferably separate from the physical system. For example, the manufacture can send the first-time seal password to the end user along with an order confirmation, a shipping confirmation, an invoice, or via a separate email and letter. In other embodiments, the end user can log into the manufactures system to retrieve the first-time seal password, such as after verifying the serial number of the system received matches the serial number of the system sent to the end user.

Figure 3:
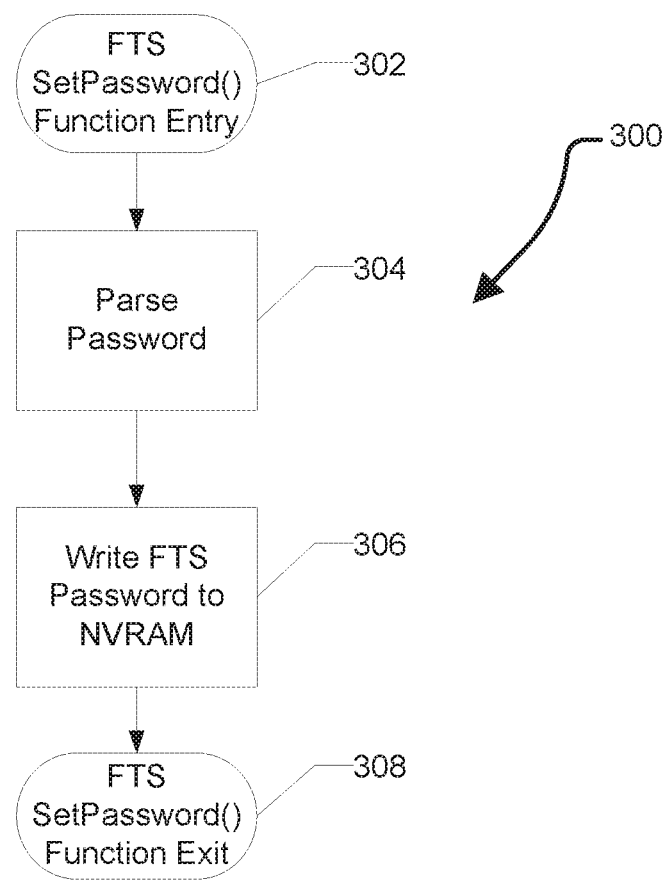
FIG. 3 is a flow diagram illustrating an exemplary method of setting a first-time use password for an information handling system according to an embodiment of the present disclosure.

FIG. 3 illustrates a method 300 for setting the first-time seal password. At 302, a function can be called at the manufacturer to set the first-time seal password. At 304, the BIOS can parse the password and, at 306 the BIOS can store the password into a non-volatile random access memory (NVRAM). In various embodiments, the first-time seal password can be preserved during a CMOS batter loss or an NVRAM CLR scenario to ensure the system cannot boot without the first-time seal password. At 308, the function can exit.

In various embodiments, the function can be a one-time use function and the BIOS can set a flag in NVRAM that the function has been used. This can prevent the first-time seal password from being reset by a third party after the system has left the manufactured. In other embodiments, the function can require authentication by the manufacturer to set the first-time seal password.

In various embodiments, it may be possible for a third party to reprogram the BIOS read only memory (ROM) via a serial peripheral interface (SPI) programmer, thus allowing the third party to reset the BIOS and set a first-time use password. However, to trick the end user into thinking the system has not been tampered with, the third party would need to reset the first-time use password with the same password provided by the manufacturer or trick the end user into thinking a password provided by the third party was provided by the manufacturer.

Figure 4:
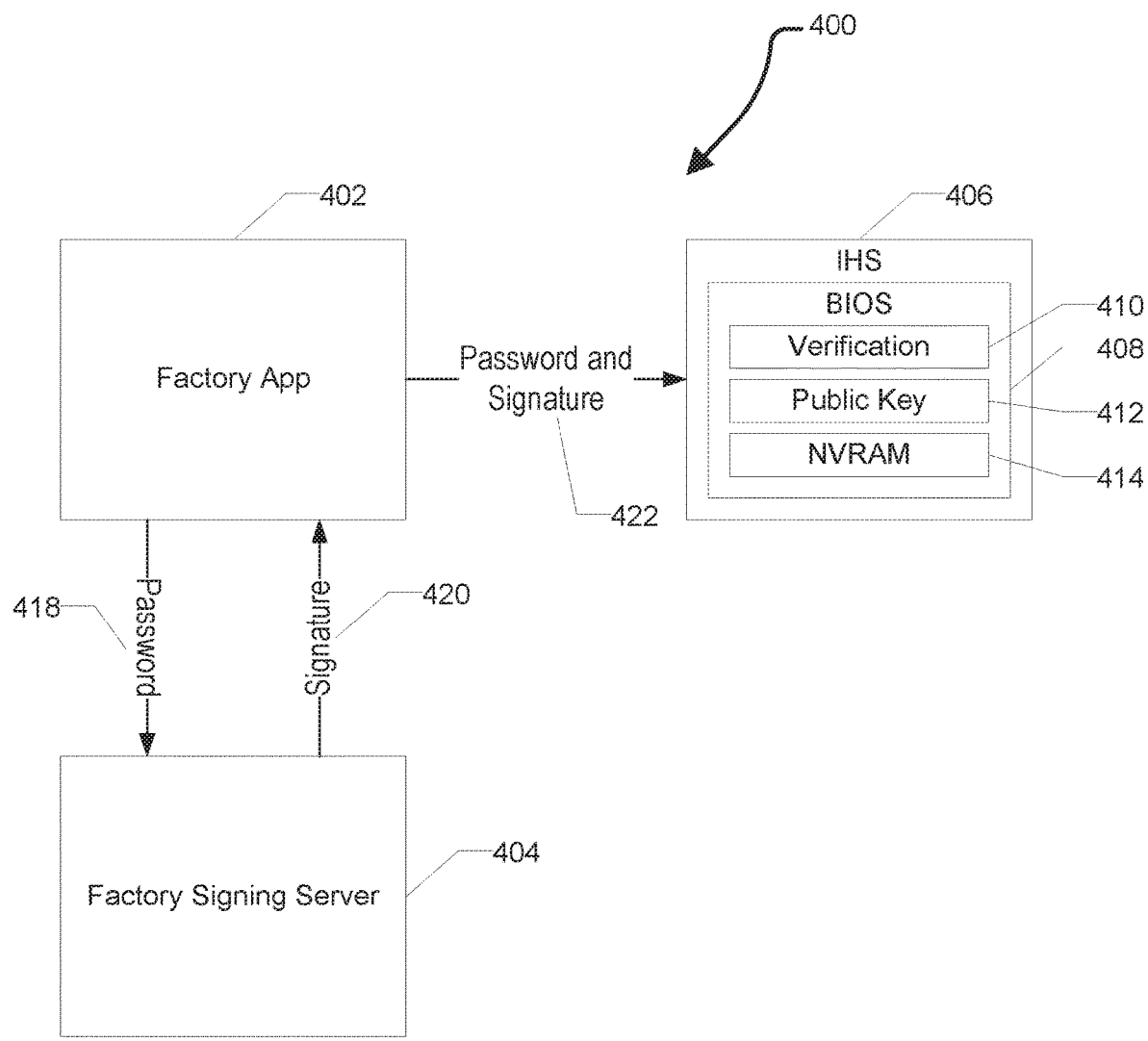
FIG. 4 is a block diagram illustrating a system for authenticating a first-time use password for an information handling system according to an embodiment of the present disclosure.

In order to ensure a third party cannot set the first-time use password, the system can require the password to be digitally signed by the manufacturer. FIG. 4 illustrates a system 400 for authenticating the first-time seal password by the manufacturer to prevent a third party from resetting the first-time seal password. The system can include a Factory App 402, a Factory Signing Server 404, and the information handling system 406. The information handling system 406 can include a BIOS 408 programmed with code for verifying the first-time seal password 410, a public key 412 of the factory signing server 404, and an NVRAM 414 for storing the first-time seal password. The factory signing server 404 can include a private key 416 for signing the first-time seal password.

In various embodiments, the factory app 402 can generate the first-time seal password and, at 418, send the password to the factory signing server 404. The factory signing server 404 can generate a signature for the password using the private key 416. At 420, the signature can be sent to the factory app 402. At 422, the factory app 402 can send the password and the signature to the BIOS 408. The BIOS 408 can utilize the verification code 410 and the public key 412 to confirm the digital signature from the factory signing server 404 prior to writing the first-time seal password to the NVRAM 414.

Figure 5:
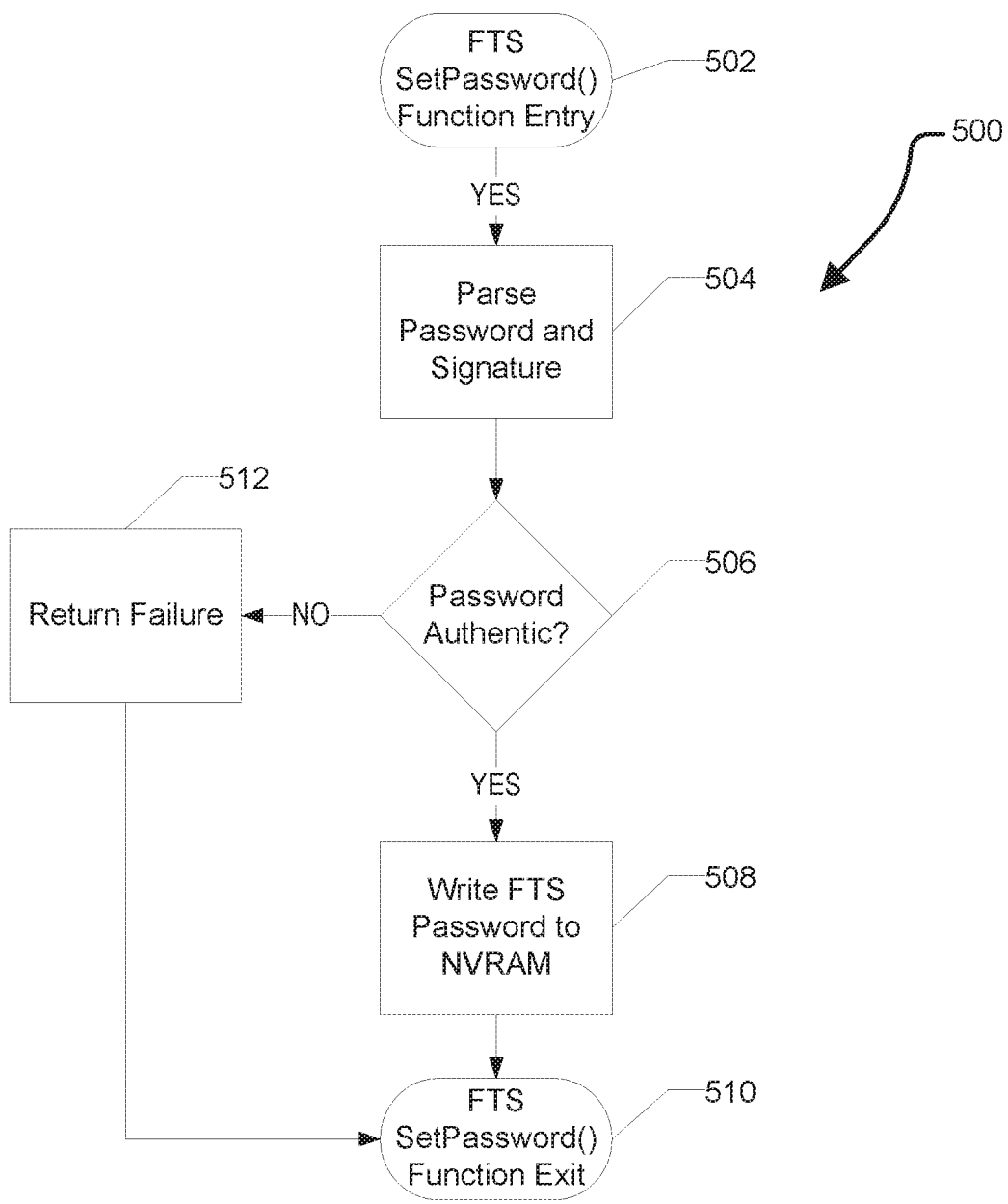
FIG. 5 is a flow diagram illustrating an exemplary method of setting an authenticated first-time use password for an information handling system according to an embodiment of the present disclosure.

FIG. 5 illustrates a method 500 for setting the first-time seal password. At 502, a function can be called at the manufacturer to set the first-time seal password and the function can be provided with the password and the signature from the factory signing server. At 504, the BIOS can parse the password and the signature. In various embodiments, the signature can be a hash of the password that is encrypted using the private key of the factory signing server. The BIOS can authenticate the password by decrypting the hash using the public key of the signing server and comparing the hash to a hash calculated from the password provided. If the decrypted hash and the calculated hash match, the password can be authenticated at 506. The password can then be written to the NVRAM at 508 and the password setting function can end successfully at 510. In various embodiments, the first-time seal password can be preserved during a CMOS batter loss or an NVRAM CLR scenario to ensure the system cannot boot without the first-time seal password.

Alternatively, if the decrypted hash and the calculated hash do not match at 508, a failure code can be returned at 512 and the password setting function can end with an error at 510 without writing the password to the non-volatile random access memory (NVRAM).

In various embodiments, an attacker can attempt to bypass the first-time seal password by reprogramming the BIOS. This can be prevented by requiring BIOS updates to be digitally signed by the manufacturer. This can ensure that any BIOS update install comes from the manufacturer and requires the first-time seal password to boot the system past POST.

In various embodiments, an attacker can attempt to bypass the first-time seal password by physically altering the hardware in the system. When combined with a tamper detection device used to indicate if the system has been physically accessed or modified, the end user can easily determine if the hardware has been physically altered. Examples of tamper detection devices can include a tamper detecting sticker or seal placed at a screws or across a seams that would need to be broken to physically open the system, a hardware or firmware solution that can detect a change in the physical components of the system, or other techniques known in the art. When the end user receives the system, a check can be made of the tamper detection device to ensure the system has not been physically altered.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a processor;
   a non-volatile random access memory (NVRAM); and
   a basic input/output system (BIOS) including instructions that when executed on the processor:
      begin a power-on self test (POST) for the information handling system;
      during the POST, the BIOS to:
         check for a first-time password in the NVRAM, wherein the first-time password being present indicates that the information handling system is being booted to a first time; and
         in response to the first-time password being present:
            prompt a user for a password;
            compare the password to the first-time password; and
            in response to the password matching the first-time password:

delete the first-time password from the NVRAM; and continue the POST and boot the information handling system.

2. The information handling system of claim 1, wherein the first-time password is set in the factory and stored in the NVRAM.

3. The information handling system of claim 1, wherein the first-time password is provided to the end user separate from the information handling system.

4. The information handling system of claim 3, wherein the password is provided after the end user verifies an identifier of the information handling system matches an identifier of an information handling system ordered by the end user.

5. The information handling system of claim 1, wherein the BIOS further includes instructions to:

receive the first-time password and a signature from a signing server; and verify the signature prior to writing the password to the NVRAM.

6. The information handling system of claim 5, wherein verifying the signature includes:

decrypting the signature for the signing server to obtain a decrypted hash; and comparing the decrypted hash to a calculated hash of the password.

7. The information handling system of claim 6, wherein the BIOS further includes a public key for a signing server and decrypting the signature includes decrypting the signature using the public key.

8. The information handling system of claim 6, wherein the BIOS further includes instructions to reject the password when the decrypted hash does not match the calculated hash.

9. The information handling system of claim 1, wherein the BIOS further comprises instructions to prevent booting the information handling system if the password does not match the first-time password.

10. The information handling system of claim 1, wherein the information handling system includes a tamper detection device to detect physical tampering with the information handling system.

11. A method of booting an information handling system for the first time, comprising:

beginning, by a basic input/output system (BIOS), a power-on self test (POST) for the information handling system;

during the POST:

checking for a first-time password stored in a non volatile random access memory (NVRAM), wherein the first-time password being present indicates that the information handling system is being booted to a first time; and in response to the first-time password being present:

obtaining a password from a user;

comparing the password to the first-time password; and in response to the password matching the first-time password:

deleting the first-time password from the NVRAM; and continuing the POST and booting the information handling system.

12. The method of claim 11, wherein the first-time password is set in the factory and stored in the NVRAM.

13. The method of claim 11, further comprising providing the password to the end user separate from the information handling system.

14. The method of claim 13, wherein the password is provided after the end user verifies an identifier of the information handling system matches an identifier of an information handling system ordered by the end user.

15. The method of claim 11, further comprising preventing booting of the information handling system if the password does not match the first-time password.

16. The method of claim 11, further comprising writing the first-time password to the NVRAM after verifying a signature and password from a signing server.

17. A method of setting a first-time password, comprising:

receiving a first-time password and a signature;

decrypting the signature to obtain a decrypted hash;

determining a calculated hash of the first-time password;

comparing the calculated hash to the decrypted hash;

writing the first-time password to NVRAM when the calculated hash matches the decrypted hash;

retaining the first-time password in the NVRAM during an NVRAM clear operation, wherein the first-time password in the NVRAM is only deleted in response to an end user entering a password that matches the first-time password during a power-on self test (POST) for the information handling system.

18. The method of claim 17, wherein decrypting the signature includes decrypting the signature with a public key of a signing server.

19. The method of claim 17, further comprising rejecting the password of the calculated hash does not match the decrypted hash.

20. The method of claim 17, further comprising requiring an end user to enter the first-time password before booting for the first-time.

* * * * *